(12) United States Patent
Rae et al.

(10) Patent No.: US 8,108,466 B2
(45) Date of Patent: Jan. 31, 2012

(54) AUTOMATED OFFLOADING OF USER-DEFINED FUNCTIONS TO A HIGH PERFORMANCE COMPUTING SYSTEM

(75) Inventors: Chris L Rae, Seattle, WA (US); Charles David Ellis, Seattle, WA (US); Mark Dalin Parris, Duvall, WA (US); Minggiang Xu, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 432 days.

(21) Appl. No.: 12/113,930

(22) Filed: May 1, 2008

(65) Prior Publication Data

US 2009/0276482 A1 Nov. 5, 2009

(51) Int. Cl.
G06F 15/16 (2006.01)
G06F 15/173 (2006.01)
(52) U.S. Cl. .................... 709/205; 709/225; 709/226
(58) Field of Classification Search .................. 709/205, 709/203, 225, 226
See application file for complete search history.

(56) References Cited

U.S. PATENT DOCUMENTS

| | | | |
|---|---|---|---|
| 6,430,584 B1 | 8/2002 | Comer et al. | |
| 6,490,625 B1* | 12/2002 | Islam et al. ................... | 709/229 |
| 6,519,597 B1 | 2/2003 | Cheng et al. | |
| 7,266,763 B2 | 9/2007 | Peyton-Jones et al. | |
| 2005/0015714 A1 | 1/2005 | Cahill et al. | |
| 2005/0080820 A1 | 4/2005 | Koppel et al. | |
| 2005/0273685 A1* | 12/2005 | Sachdev et al. ............... | 714/742 |
| 2006/0020620 A1 | 1/2006 | Iyer et al. | |
| 2006/0036939 A1 | 2/2006 | Hobbs et al. | |
| 2006/0117208 A1* | 6/2006 | Davidson ........................ | 714/4 |
| 2006/0224946 A1 | 10/2006 | Barrett et al. | |
| 2008/0034009 A1* | 2/2008 | Freedman et al. ............. | 707/201 |
| 2009/0216910 A1* | 8/2009 | Duchesneau .................. | 709/250 |

OTHER PUBLICATIONS

Forta, "Introducing User Defined Functions", 1994-2008, SYS-CON Publications, Inc., pp. 6.
Gainer, "Multi-Threaded Calculation in Excel, or How Calculation Can Become Much Faster in Excel 12", Nov. 3, 2005, Microsoft Corporation, pp. 7.
Gainer, "Excel 2007 and CCS 2003", Jun. 26, 2006, Microsoft Corporation, pp. 2.
Wierer, "Performance and Reliability for Excel Spreadsheets through High Performance Computing", Mar. 2007, Microsoft Corporation, pp. 27.
Forta, "Introducing User Defined Functions", Apr. 27, 2001, Enterprise OpenSource Magazine, SYS-CON Publications, Inc., pp. 6.

* cited by examiner

Primary Examiner — Patrice Winder
Assistant Examiner — Ebrahim Golabbakhsh
(74) Attorney, Agent, or Firm — Hope Baldauff Hartman, LLC (57) ABSTRACT

Technologies are described herein for the automated offloading of the execution of a user-defined function ("UDF") to a high performance computing ("HPC") system. When a request is received to calculate a workbook that references a UDF, a spreadsheet application program determines, based upon a tag set by the UDF, whether the UDF is safe for execution on the HPC system. If the UDF is safe for execution on the HPC system, the spreadsheet application program causes the UDF to be executed on the HPC system using a connector that communicates with the HPC system to cause the UDF to be executed thereupon. A container executing on the HPC system emulates interfaces provided by the spreadsheet application program and is utilized to execute the UDF. Results of the execution of the UDF on the HPC system may be returned asynchronously to the connector and to the spreadsheet application program.

15 Claims, 5 Drawing Sheets

AUTOMATED OFFLOADING OF USER-DEFINED FUNCTIONS TO A HIGH PERFORMANCE COMPUTING SYSTEM

BACKGROUND

Some spreadsheet application programs allow the use of custom functions, called User-Defined Functions ("UDFs"), that can be utilized in the same manner as built-in functions provided natively by the spreadsheet application program. UDFs can be created in different ways, but are generally implemented as user-created program code external to the spreadsheet application program that can be called from within a workbook. For instance, a UDF may be created in the form of a dynamic-link library ("DLL") that can be called from a workbook to perform complex arithmetic, advanced mathematics, or other functions not natively provided by the spreadsheet application program.

Some UDFs that perform complex calculations require significant computational resources. In an attempt to provide the maximum amount of processing capability to the UDFs, some spreadsheet application programs can determine if the host computing system that is executing the spreadsheet application program has one or more central processing units ("CPUs") that have multiple processor cores. When the spreadsheet application program detects CPUs that have multiple processor cores, the spreadsheet application program can offload the execution of different UDFs to different processor cores. Even in light of this optimization, however, there are many types of UDFs that could benefit from even greater processing resources than those provided by typical host computing systems that have multi-core CPUs.

It is with respect to these considerations and others that the disclosure made herein is presented.

SUMMARY

Technologies are described herein for the automated offloading of the execution of UDFs to a high performance computing ("HPC") system. In particular, using the concepts and technologies provided herein, a spreadsheet application program can offload execution of UDFs to a HPC system in an automated fashion. In this manner, the spreadsheet application program can utilize the significant processing capabilities provided by a HPC system to execute computationally complex UDFs.

According to one aspect presented herein, a spreadsheet application program is provided that is capable of offloading the execution of UDFs to a HPC system in an automated fashion. In particular, the spreadsheet application program includes functionality for allowing a workbook to reference a UDF. When a request is received to calculate a workbook that references a UDF, the spreadsheet application program determines, based upon a tag attached to the UDF, whether the UDF is safe for execution on the HPC system. If the UDF is not safe for execution on the HPC system, the UDF is executed locally on the computing system executing the spreadsheet application program. If, however, the UDF is safe for execution on the HPC system, the spreadsheet application program causes the UDF to be executed on the HPC system. If there is no HPC system available or the UDF is not safe for execution on an HPC system, the UDF will be executed locally on the computing system that is executing the spreadsheet application program.

According to other aspects, the spreadsheet application program operates in conjunction with a connector executing on the same computing system as the spreadsheet application program to cause UDFs to be executed on the HPC system. The connector is a software component that receives and responds to requests from the spreadsheet application program to execute UDFs on the HPC system. In particular, in response to receiving a request from the spreadsheet application program to execute a UDF on the HPC system, the connector communicates with the HPC system to cause the UDF to be executed thereupon. The spreadsheet application program may utilize multiple connectors in order to execute UDFs on multiple different HPC systems.

In order to execute a UDF, the HPC system utilizes a container that executes on each of the nodes of the HPC system in one implementation. The container is a software component that emulates interfaces exposed by the spreadsheet application program in order to execute the UDF on the HPC system. In this manner, the UDF operates as if it had been called directly by the spreadsheet application program directly and is unaware that it has been executed by the container on the HPC system. When the UDF has completed its execution, it returns its results to the container. The container, in turn, returns the results to the connector. The connector then returns the results to the spreadsheet application program. The results may be returned from the container to the connector and from the connector to the spreadsheet application program asynchronously.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for automated offloading of the execution of UDFs to a HPC system. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for offloading the execution of UDFs to an HPC system will be described.

Figure 1:
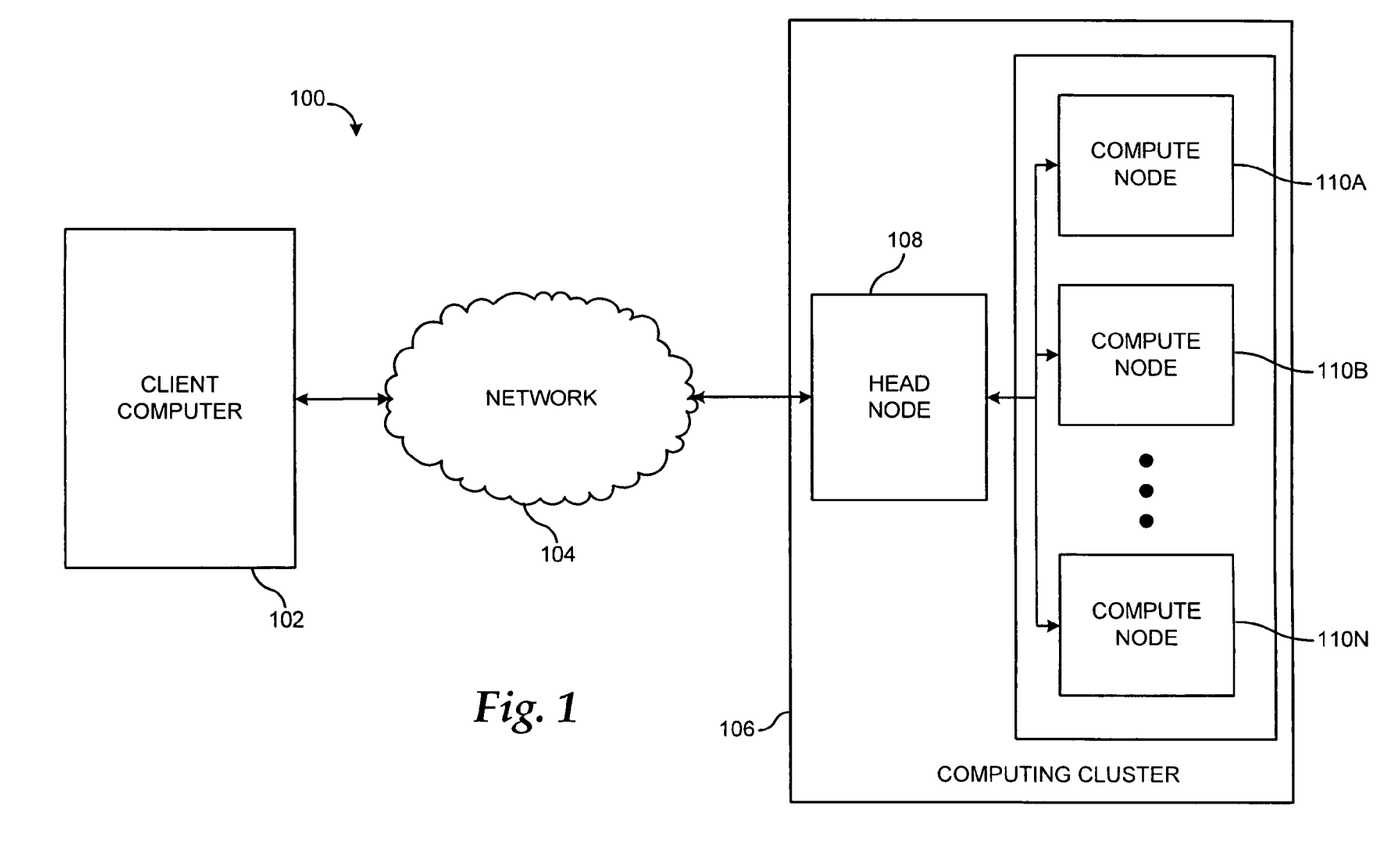
FIG. 1 is a computing system diagram showing aspects of an illustrative operating environment for implementing the embodiments presented herein.

Turning now to FIG. 1, details will be provided regarding an illustrative operating environment for implementing the various technologies presented herein. In particular, FIG. 1 illustrates a system 100 for executing the software components described herein for offloading UDFs to a HPC system. The system 100 includes a client computer 102 capable of connecting to a HPC system through a network 104. The client computer 102 comprises a desktop, laptop, or mobile computing system capable of executing a spreadsheet application program and the various software components presented herein for offloading UDFs to a HPC system.

The system 100 also includes a HPC system, such as the computing cluster 106. It should be appreciated that an HPC system is any type of computing system that offers computational performance at least an order of magnitude greater than a desktop computing system. For instance, HPC systems may include, but are not limited to, computing clusters, such as the computing cluster 106, mainframe computing systems, supercomputers, or other types of high performance grid computing systems.

In the embodiments presented herein, the HPC system utilized by the client computer 102 comprises the computing cluster 106. The computing cluster 106 includes a head node 108 and one or more compute nodes 110A-110N. As known in the art, the head node 108 comprises a computing system responsible for performing tasks such as job management, cluster management, scheduling of tasks, and resource management for all of the compute nodes 110A-110N in the computing cluster 106. The compute nodes 110A-110N are computing systems that perform the actual computations. For instance, as will be described in greater detail below, in the embodiments presented herein, the compute nodes 110A-110N are utilized to execute UDFs that would otherwise execute at the client computer 102. The computing cluster 106 may have virtually any number of compute nodes 110A-110N.

It should be appreciated that the network 104 may comprise any type of local area or wide area network suitable for connecting the client computer 102 and the computing cluster 106. For instance, in one embodiment, the network 104 comprises a high-speed local area network suitable for connecting the client computer 102 and the computing cluster 106. In other embodiments, however, the network 104 may comprise a high-speed wide area network, such as the Internet, for connecting the client computer 102 and the computing cluster 106 over a greater geographical area. It should also be appreciated that the computing cluster 106 may also utilize various high-speed interconnects between the head node 108 and each of the compute nodes 110A-110N. Additional details regarding the operation of the client computer 102 and the computing cluster 106 with regard to the offloading of UDFs from the client computer 102 to the computing cluster 106 will be described in greater detail below with reference to FIGS. 2-4.

Figure 2:
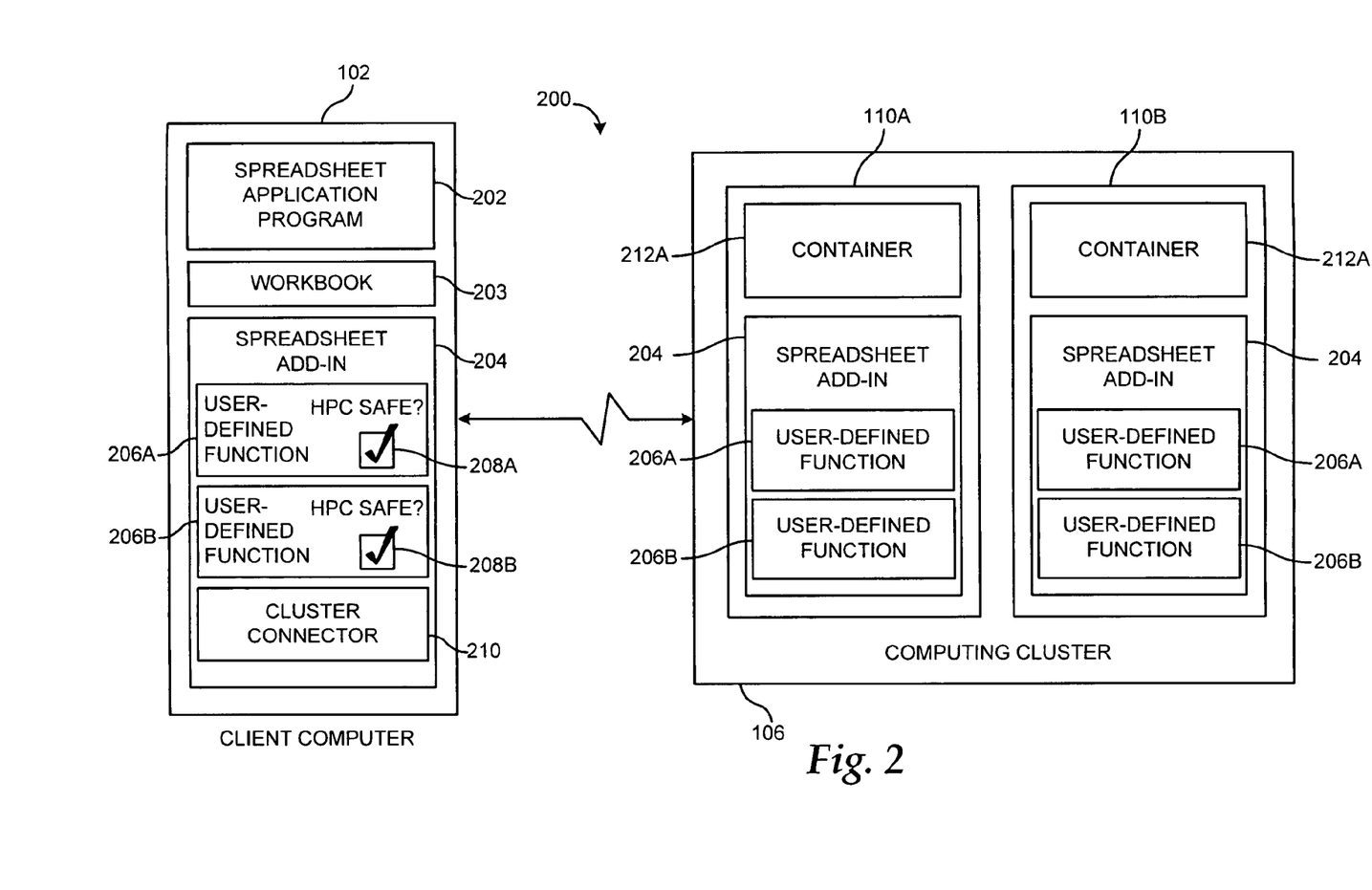
FIG. 2 is a software architecture diagram showing aspects of several software components provided herein.

Referring now to FIG. 2, additional details will be provided regarding the operations of the various software components presented herein. In particular, a system 200 is illustrated in FIG. 2 that includes the client computer 102, the computing cluster 106, and various software components executing on each of these computing systems for offloading the execution of UDFs. In particular, as shown in FIG. 2, the client computer 102 is configured to execute a spreadsheet application program 202. As known in the art, a spreadsheet application program 202 is a computer application that allows a user to create spreadsheets containing grids of rows and columns. The intersection of each row and column is a cell containing either alphanumeric text, numerical values, formulas, or other data. Spreadsheet cells may include native formulas provided by the spreadsheet application program 202 or may reference an external spreadsheet add-in 204 that contains one or more UDFs 206A-206B.

As discussed briefly above, the UDFs 206A-206B are custom functions that can be utilized in the same manner as built in functions provided natively by the spreadsheet application program 202. The UDFs 206A-206B can be created in different ways, but are generally implemented as user created program code external to the spreadsheet application program 202 that can be called from a workbook 203 containing one or more spreadsheets. For instance, in one embodiment, the UDFs 206A-206B may be created in the form of DLLs that can be called from the workbook 203 to perform complex arithmetic, advance mathematics, or other functions not natively provided by the spreadsheet application program 202. It should be appreciated that the spreadsheet application program 202 may provide significant additional functionality with respect to the creation of a workbook 203 then those described herein.

According to the various embodiments presented herein, the spreadsheet application program 202 is configured to allow execution of the UDFs 206A-206B to be offloaded to the computing cluster 106. In order to provide this functionality, each of the UDFs 206A-206B sets a tag 208A-208B, respectively, indicating whether the UDF can be executed by the computing cluster 106. The tags 208A-208B indicate whether it is safe to execute the corresponding UDF on the computing cluster 106.

In general, a UDF 206A-206B is safe to be executed on the computing cluster 106 if the UDF does not depend on data generated and stored on the same computer that it ran on the last time. This is because no state can be maintained at the computing cluster 106 and because a UDF may be executed on different computing nodes 110A-110N during subsequent executions.

As will be discussed in greater detail below, when a request is received to execute one of the UDFs 206A-206B, such as for instance a request to recalculate a workbook 203 that references the UDFs, the spreadsheet application program 202 examines the tags 208A-208B to determine if the UDFs may be offloaded to the computing cluster 106. If not, the UDFs are executed at the client computer 102. If, however, the tags 208A-208B indicate that the UDFs 206A-206B may be executed on the computing cluster 106, the spreadsheet application program 202 offloads execution of the UDFs 206A-206B to the computing cluster 106. It should be appreciated that, if no computing cluster is available or attached to the current spreadsheet session, the UDFs 206A-206B will run locally on the client computer 102.

In order to offload the execution of a UDF 206 to the computing cluster 106, the spreadsheet application program 202 utilizes a cluster connector 210. The cluster connector 210 executes at the client computer and provides an interface between the spreadsheet application program 202 and the computing cluster 106. In particular, the cluster connector 210 stores configuration settings such as the network address and other information regarding the particular computing cluster 106 that should be utilized, starts sessions with a container 212 executing on the computing cluster 106, submits requests to the container 212 and retrieves results from the container 212. The cluster connector 210 is also responsible for closing sessions with the container 212, serializing and de-serializing parameters provided to the container 212, handling any errors returned from the computing cluster 106, and sending canceled operation messages to the computing cluster 106 if a user requests to cancel execution of a UDF 206 on the computing cluster 106.

In order to utilize a cluster connector 210 with the spreadsheet application 202, the cluster connector 210 registers itself at the client computer 102. Multiple cluster connectors 210 may be executed on the client computer 102 for communicating with different computing clusters 106 from different vendors. Once a cluster connector 210 has been registered, a user interface may be provided to a user of the client computer 102 allowing the user to specify that the UDFs 206A-206B contained within the spreadsheet add-in 204 are permitted to execute on the computing cluster 106 when possible. The user interface may also include functionality for allowing a user of the client computer 102 to specify the particular computing cluster 106 upon which the UDFs 206A-206B should be executed when more than one computing cluster is available.

As described briefly above, each compute node 110A-110N that is to execute the UDFs includes a container 212. A container 212 is a software component that emulates interfaces exposed by the spreadsheet application program 202 in order to execute the UDFs 206A-206B on the computing cluster 106. The cluster connector 210 communicates with the container 212 to instruct the container to execute the UDFs 206 and to receive results of the execution. Because the container 212 exposes interfaces provided by the spreadsheet application 202, the spreadsheet add-in 204 and the UDFs 206A-206B contained therein are unaware that they have not been directly executed by the spreadsheet application program 202 on the client computer 102.

In the example shown in FIG. 2, the spreadsheet add-in 204 includes two user defined functions 206A-206B, both of which have been indicated as being safe for execution on the computing cluster 106 through the setting of the tags 208A-208B. In this example, the workbook 203 includes references to each of the user defined functions 206A-206B. When the spreadsheet application program 202 receives a request to refresh the contents of the workbook 203, the spreadsheet application program 202 first determines whether a user has indicated that the computing cluster 106 may be utilized to execute the UDFs 206A-206B. If so, the spreadsheet application program 202 then determines whether the UDFs 206A-206B are safe for execution on the computing cluster 106 through the examination of the tags 208A-208B. In this example, both of the UDFs 206A-206B are safe for execution on the computing cluster 106. As a result, the spreadsheet application program 202 then identifies the appropriate cluster connector 210 for communicating with the computing cluster 106.

Once the proper cluster connector 210 has been identified, the spreadsheet application program 202 provides instructions to the cluster connector 210 to execute the UDFs 206A-206B on the computing cluster 106. In response thereto, the cluster connector 210 communicates with the head node 108 and provides instructions to execute the containers 212A-212B and UDFs 206A-206B. In response to receiving these instructions, the head node 108 coordinates the execution of these modules. For instance, in the example shown herein, the head node 108 causes the containers 212A-212B to be executed on the computing nodes 110A-110B, respectively.

Each of the containers 212A-212B loads the spreadsheet add-in 204 and causes the appropriate UDF contained therein to be executed. Results of execution of the UDF are returned to the appropriate container. Each container 212A-212B then returns the results of the execution of the UDFs 206A-206B to the cluster connector 210. In turn, the cluster connector 210 returns the results of the execution to the spreadsheet application program 202.

It should be appreciated that instructions to execute the UDFs 206A-206B may be provided to the containers 212A-212B asynchronously. It should also be appreciated that results returned from the execution of the UDFs 206A-206B at the computing cluster 106 may be returned from the container 212A to the cluster connector 210B and subsequently to the spreadsheet application 202 asynchronously. In this manner, it should be appreciated that the spreadsheet application program 202 can cause virtually any number of UDFs 206 to be asynchronously executed on the various nodes of the computing cluster 106. Additional details regarding this process will be provided below with respect to FIGS. 3A-3B.

Figure 3A:
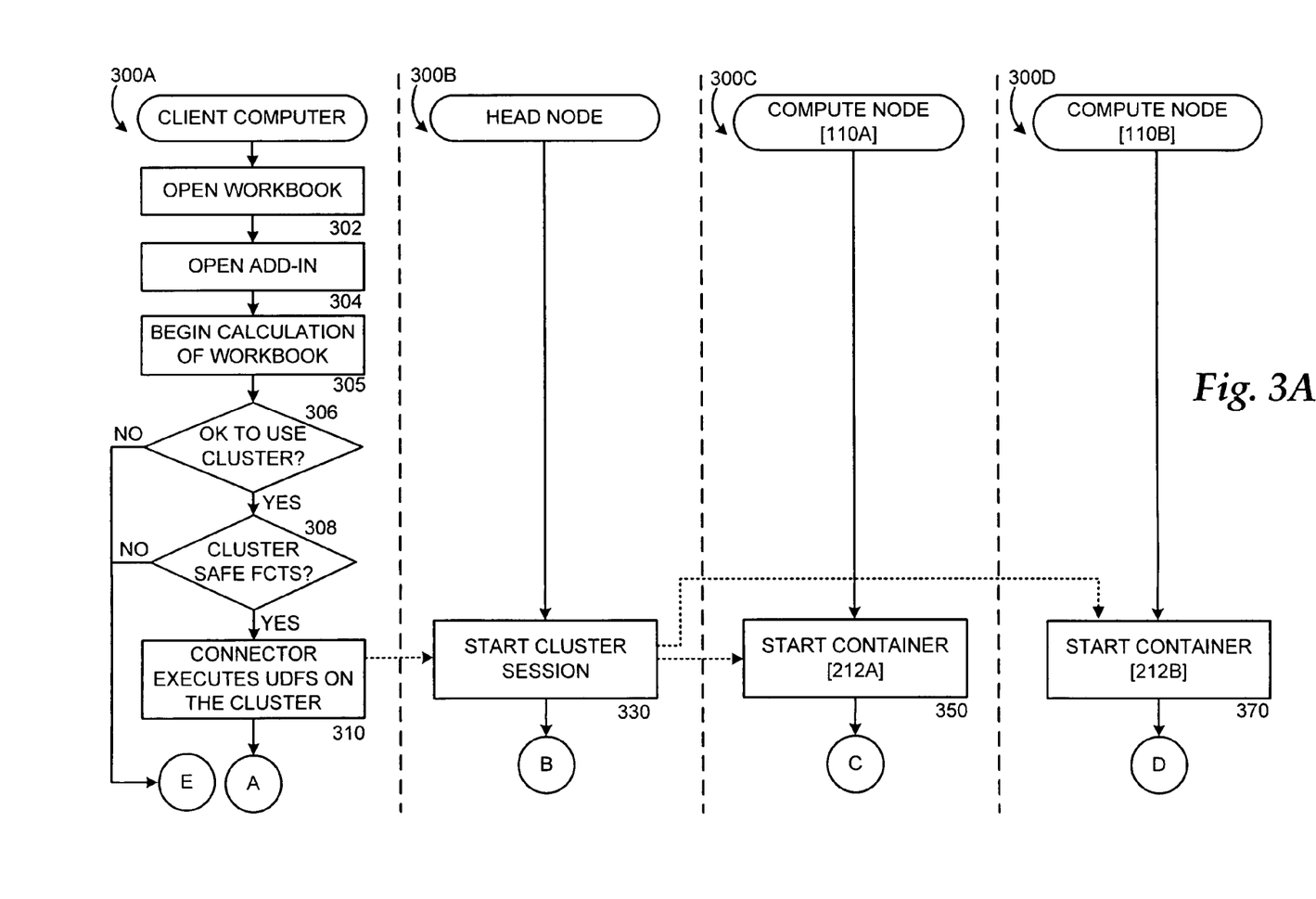
FIGS. 3A-3B are flow diagrams showing several routines for the automated offloading of the execution of UDFs to a HPC system in one embodiment presented herein.
Figure 3B:
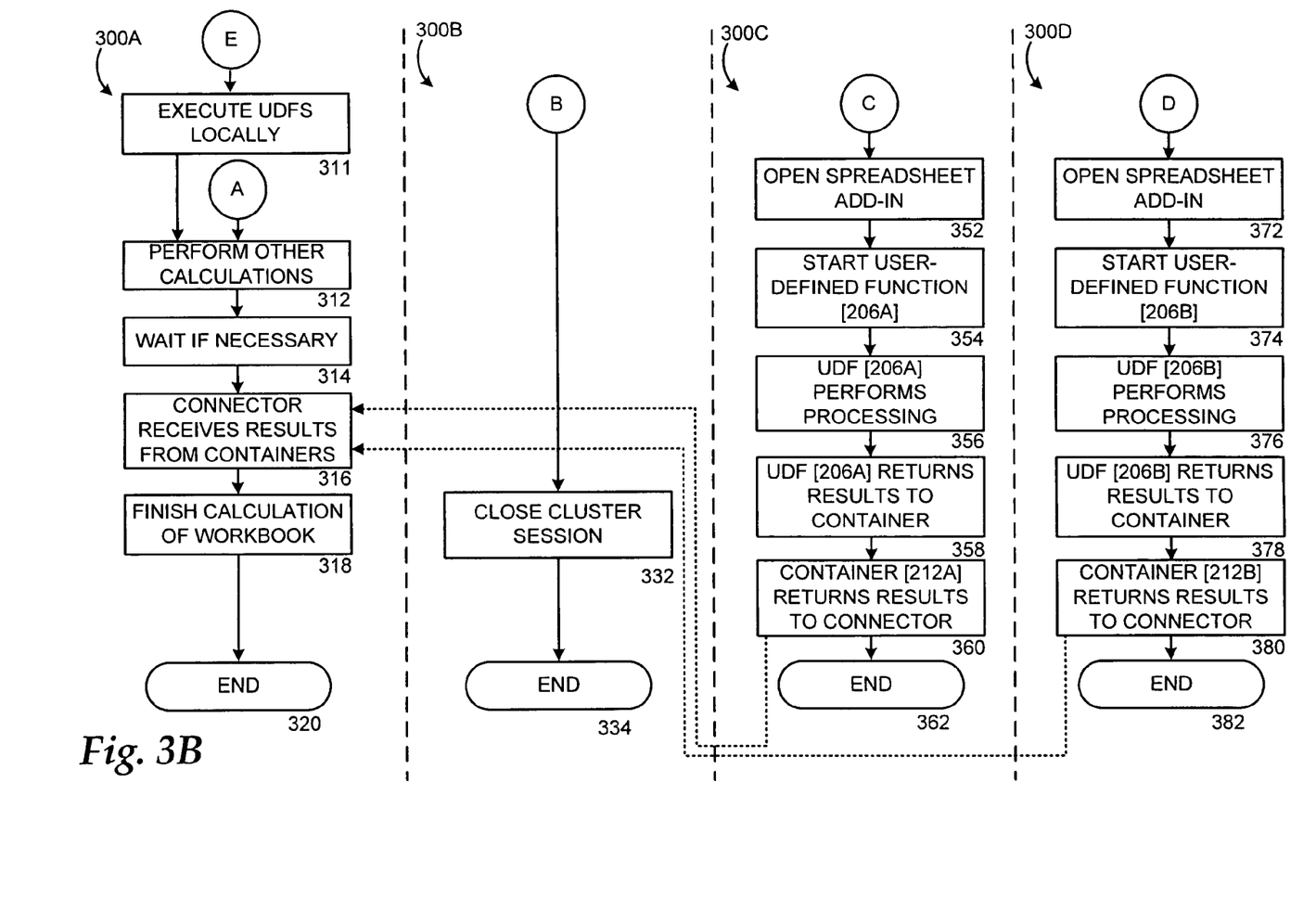

Referring now to FIGS. 3A-3B, additional details will be provided regarding the embodiments presented herein for automated offloading of the execution of a UDF to a HPC system. In particular, FIGS. 3A-3B are flow diagrams showing several routines 300A-300D that together illustrate aspects of the operation of the client computer 102, the head node 108, and the compute nodes 110A-110B, respectively, in one illustrative embodiment. The routines 300A-300D are described together to illustrate the interoperation of the various software components executing on each of these computing systems.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300A begins at operation 302, where the spreadsheet application program 202 is utilized to open the workbook 203. In the example described above with respect to FIG. 2, the workbook 203 references a spreadsheet add-in 204 that includes the two UDFs 206A-206B. This example will also be utilized in the description provided herein of FIGS. 3A-3B to illustrate the operation of the client computer 102, the head node 108, and the compute nodes 110A-110B.

Once the workbook 203 has been opened at operation 302, the routine 300A proceeds to operation 304, where the spreadsheet add-in 204 is also opened. The routine 300A then continues to operation 305, where a request is received to calculate the workbook 203. In response to such a request, the routine 300A proceeds to operation 306, where the spreadsheet application program 202 determines whether the computing cluster 106 may be utilized to execute the referenced UDFs 206A-206B. As mentioned above, the spreadsheet application program 202 may provide a user interface for allowing a user of the client computer 102 to specify whether it is permissible for the spreadsheet application program 202 to offload execution of the UDFs 206A-206B to the computing cluster 106. If it is not permissible to offload the UDFs 206A-206B to the computing cluster 106, the routine 300 proceeds from operation 306 to operation 311, where the UDFs 206A-206B are executed locally at the client computer 102. If, however, it is permissible for the execution of the UDFs 206A-206B to be offloaded, the routine 300A proceeds from operation 306 to operation 308.

At operation 308, the spreadsheet application program 202 determines whether the UDFs 206A-206B are safe for execution on the computing cluster 106. As described briefly above, in one embodiment the spreadsheet application program 202 examines the tags 208A-208B set by the UDFs 206A-206B. If the tags 208A-208B indicate that the UDFs 206A-206B are not safe for execution on the computing cluster 106, the routine 300 proceeds to operation 311 where the UDFs 206A-206B are executed locally at the client computer 102. If, however, the tags 208A-208B indicate that the UDFs 206A-206B are safe for execution at the computing cluster 106, the routine 300A proceeds from operation 308 to operation 310.

At operation 310, the spreadsheet application program 202 calls the cluster connector 210 and provides an instruction to the cluster connector to execute the UDFs 206A-206B at the computing cluster 106. In response to such a request, the cluster connector 210 communicates with the head node 108 to request the start of a new cluster session. This request is received by the head node 108 at operation 330 of the routine 300B. In response to such a request, a new cluster session is started and the containers 212A-212B are instantiated on the compute nodes 110A-110B, respectively. It should be appreciated that the head node 108 may select other compute nodes for execution of the containers. The container 212A is executed on the compute node 110A at operation 350 of the routine 300C. The container 212B is executed on the compute node 110B at operation 370 of the routine 300D.

Once the spreadsheet application program 202 has instructed the cluster connector 210 to offload the execution of the UDFs 206A-206B, it may begin performing other calculations. This occurs at operation 312 of the routine 300A. Once these additional calculations have been performed, it may be necessary for the spreadsheet application program 202 to wait for the results of the execution of the UDFs 206A-206B from the cluster connector 210. If so, the spreadsheet application program 202 waits at operation 314. As discussed above, the results of the execution of the UDFs 206A-206B may be returned from the cluster connector 210 to the spreadsheet application program 202 asynchronously.

Once the container 212A has begun execution on the compute node 110A, the routine 300C proceeds from operation 350 to operation 352. At operation 352, the container 212A opens the spreadsheet add-in 204. As discussed above, the container 212A emulates interfaces provided by the spreadsheet application program 202 to perform this functionality. In this manner, the spreadsheet add-in 204 is unaware that it is not actually being opened by the spreadsheet application program 202.

Once the container 212A has opened the spreadsheet add-in 204, it causes the UDF 206A to be executed at operation 354. The routine 300C then continues to operation 356 where the UDF 206A performs its processing. Once the processing has completed, the routine 300C proceeds to operation 358 where the UDF 206A returns the results of its calculation to the container 212A. In turn, the container 212A returns the results of the calculations performed by the UDF 206A to the cluster connector 210 at operation 360. The routine 300C then continues from operation 360 to operation 362, where it ends.

It should be appreciated that the compute node 110D executes the container 212B and performs a parallel set of operations for causing the UDF 206B to be executed at the compute node 110D. This processing occurs at the operations 370-380 of the routine 300D, culminating with the return of the results of the computation from the container 212B to the cluster connector 210 at operation 380. The routine 300D ends at operation 382. Once all of the UDFs 206A-206B have completed executing, the head node 108 may close the cluster session. This occurs at operation 332 of the routine 300B. The routine 300B proceeds from operation 332, to operation 334 where it ends.

At operation 316 of the routine 300A, the cluster connector 210 receives the results of the execution of the UDFs 206A-206B from the containers 212A-212B, respectively. As discussed above, these results may be received by the cluster connector 210 asynchronously. As each result is returned, it is passed from the cluster connector 210 to the spreadsheet application program 202.

Once the spreadsheet application program 202 has received results of the execution of all the UDFs 206A-206B, it finishes calculation of the workbook 203 and displays the results. This occurs at operation 318 of the routine 300A. From operation 318, the routine 300A proceeds to operation 320, where it ends.

Figure 4:
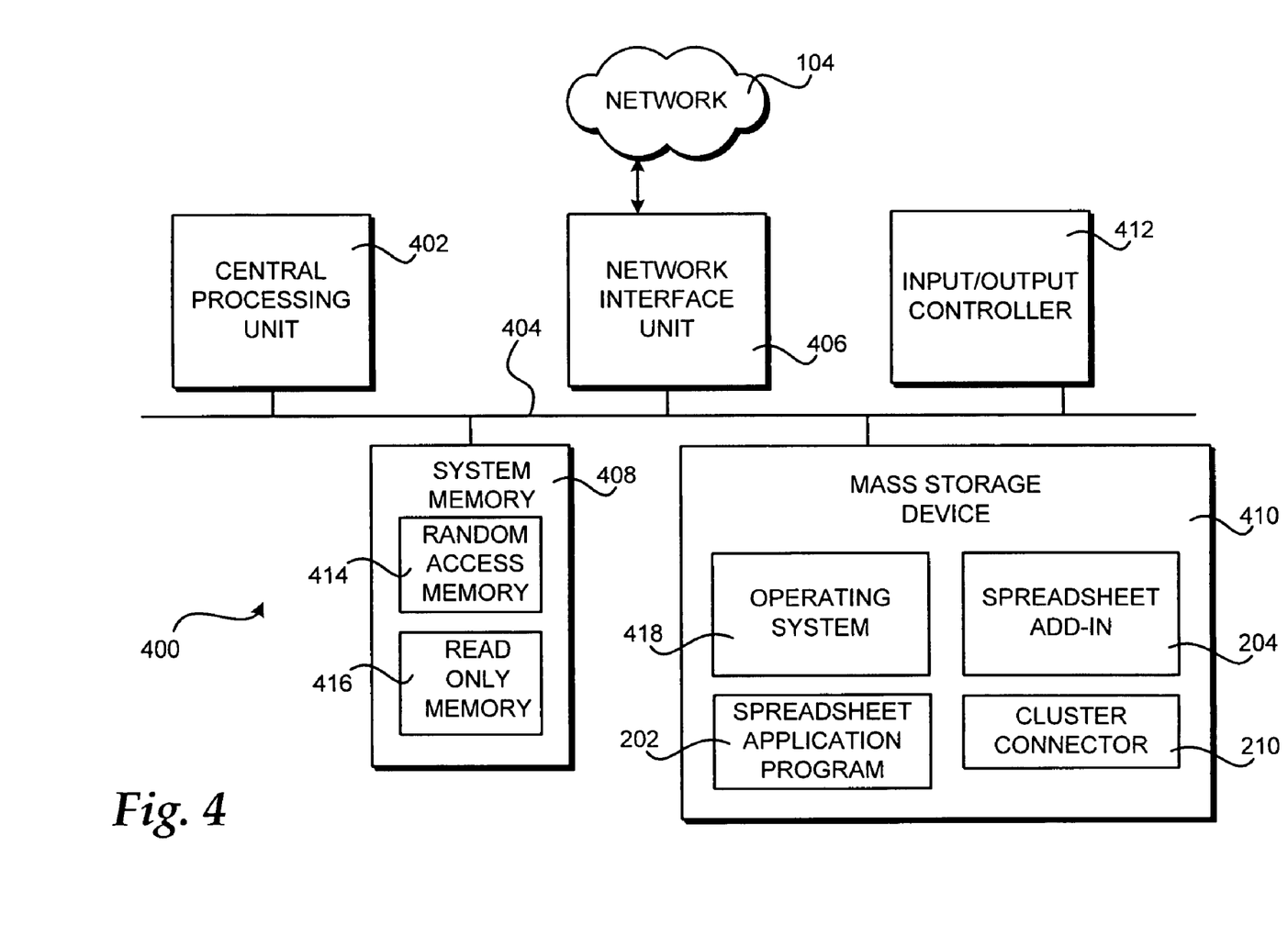
FIG. 4 is a computer architecture diagram showing an illustrative computer hardware and software architecture for a computing system capable of implementing aspects of the embodiments presented herein.

FIG. 4 shows an illustrative computer architecture for a computer 400 capable of executing the software components described herein for offloading the execution of a UDF to an HPC system in the manner presented above. The computer architecture shown in FIG. 4 illustrates a conventional desktop, laptop, or server computer and may be utilized to execute any aspects of the software components presented herein described as executing on the client computer 102 or the compute nodes 110A-110N. It should be appreciated that when the computing architecture shown in FIG. 4 is utilized to embody one of the compute nodes 110A-110N, additional memory, network adapters, processors, and mass storage may be utilized. As such, it should be appreciated that the computer architecture shown in FIG. 4 is merely illustrative and that many other types of architectures may be utilized.

The computer architecture shown in FIG. 4 includes a central processing unit 402 ("CPU"), a system memory 408, including a random access memory 414 ("RAM") and a read-only memory ("ROM") 416, and a system bus 404 that couples the memory to the CPU 402. A basic input/output system containing the basic routines that help to transfer information between elements within the computer 400, such as during startup, is stored in the ROM 416. The computer 400 further includes a mass storage device 410 for storing an operating system 418, application programs, and other program modules, which are described in greater detail herein.

The mass storage device 410 is connected to the CPU 402 through a mass storage controller (not shown) connected to the bus 404. The mass storage device 410 and its associated computer-readable media provide non-volatile storage for the computer 400. Although the description of computer-readable media contained herein refers to a mass storage device, such as a hard disk or CD-ROM drive, it should be appreciated by those skilled in the art that computer-readable media can be any available computer storage media that can be accessed by the computer 400.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 400.

According to various embodiments, the computer 400 may operate in a networked environment using logical connections to remote computers through a network such as the network 104. The computer 400 may connect to the network 104 through a network interface unit 406 connected to the bus 404. It should be appreciated that the network interface unit 406 may also be utilized to connect to other types of networks and remote computer systems. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

As mentioned briefly above, a number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the spreadsheet application program 202, the spreadsheet add-in 204, and the cluster connector 210, each of which was described in detail above with respect to FIGS. 1-3B. The mass storage device 410 and the RAM 414 may also store other types of data and program modules.

Based on the foregoing, it should be appreciated that technologies for offloading the execution of UDFs from a client computer 102 to an HPC system are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for offloading the execution of a user-defined function (UDF) defined in a spreadsheet add-in from a client computer to a high performance computing (HPC) system, the method comprising:

providing a tag within the UDF indicating whether the UDF is safe to be executed on the HPC system;

receiving a request to execute the UDF from a spreadsheet application program executing on the client computer;

in response to receiving the request to execute the UDF, determining based upon the tag whether the UDF is safe to be executed on the HPC system; and in response to determining that the UDF is safe to be executed on the HPC system, executing a connector at the client computer to cause the UDF to be executed in a container on the HPC system, the container configured to emulate interfaces exposed by the spreadsheet application program and to load the spreadsheet add-in and execute the UDF therein.

2. The method of claim 1, further comprising executing the UDF on the client computer in response to determining that the UDF is not safe to be executed on the HPC system.

3. The method of claim 1, wherein the UDF comprises a custom function defined to be called from a cell in a workbook of the spreadsheet application program, and wherein the request to execute the UDF comprises a request to calculate the workbook.

4. The method of claim 3, wherein the container is configured to return the results of the execution of the UDF to the connector asynchronously.

5. The method of claim 4, wherein the connector is configured to return the results of the execution of the UDF to the spreadsheet application program asynchronously.

6. The method of claim 5, wherein the HPC system comprises a computing cluster.

7. A computer storage medium having computer executable instructions stored thereon which, when executed by a computer, cause the computer to:

receive a request to execute a user-defined function (UDF), the UDF being contained within a spreadsheet add-in callable from a spreadsheet application program executing on a client computer;

in response to the request, to examine a tag set by the UDF to determine whether the UDF is safe to be executed on the HPC system; and in response to determining that the UDF is safe to be executed on the HPC system, to execute a connector on the client computer to cause the UDF to be executed in a container on the HPC system, the container configured to emulate interfaces exposed by the spreadsheet application program and to load the spreadsheet add-in, execute the UDF therein, and return one or more resulting values to the connector.

8. The computer storage medium of claim 7, having further executable instructions stored thereon which, when executed by the computer, cause the computer to execute the UDF on the client computer in response to determining that the UDF is not safe to be executed on the HPC system.

9. The computer storage medium of claim 7, wherein the container is configured to return the results of the execution of the UDF to the connector asynchronously and the connector is configured to return the results of the execution of the UDF to the spreadsheet application program asynchronously.

10. The computer storage medium of claim 9, wherein the UDF comprises a custom function referenced by a workbook, and wherein the request to execute the UDF comprises a request to calculate the workbook.

11. The computer storage medium of claim 10, wherein the HPC system comprises a computing cluster.

12. A system for offloading the execution of a user-defined function (UDF) from a client computer to a computing cluster, the system comprising:

a computer-readable medium storing a container capable of being executed on the computing cluster, the container configured to emulate interfaces exposed by an application program, load an application add-in containing the UDF, receive requests to execute the UDF on the computing cluster, execute the UDF, receive one or more results from the UDF, and to asynchronously return the results to a cluster connector; and a computer-readable medium storing a cluster connector capable of being executed on the client computer, the cluster connector configured to receive a request from the application program to execute the UDF on the computing cluster and, in response thereto, to communicate with the computing cluster to cause the container to execute the UDF on the computing cluster, and to receive the results from the container and to asynchronously return the results to the application program.

13. The system of claim 12, further comprising a computer-readable medium storing a spreadsheet application program configured to receive a request to recalculate a workbook that references the UDF and, in response thereto, to determine whether the UDF is safe to be executed on the computing cluster by examining a tag set by the UDF.

14. The system of claim 13, wherein the spreadsheet application program is further configured to call the cluster connector with a request to execute the UDF on the computing cluster in response to determining that the UDF is safe to be executed on the computing cluster.

15. The system of claim 14, wherein the spreadsheet application program is further configured to execute the UDF on the client computer in response to determining that the UDF is not safe to be executed on the computing cluster.

* * * * *